United States Patent
Wang et al.

(10) Patent No.: US 10,721,255 B2
(45) Date of Patent: Jul. 21, 2020

(54) SYSTEMS AND METHODS FOR ASSESSING RISKINESS OF A DOMAIN

(71) Applicant: Oath Inc., New York, NY (US)

(72) Inventors: Liang Wang, San Jose, CA (US);
Xianen Qiu, Sunnyvale, CA (US);
Liang Peng, San Mateo, CA (US);
Jianlong Zhang, Sunnyvale, CA (US)

(73) Assignee: Oath Inc., New York, NY (US)

( * ) Notice: Subject to any disclaimer, the term of this patent is extended or adjusted under 35 U.S.C. 154(b) by 237 days.

(21) Appl. No.: 15/946,190

(22) Filed: Apr. 5, 2018

(65) Prior Publication Data

US 2019/0312897 A1    Oct. 10, 2019

(51) Int. Cl.
*H04L 9/00* (2006.01)
*H04L 29/06* (2006.01)
*G06Q 30/08* (2012.01)

(52) U.S. Cl.
CPC ......... *H04L 63/1425* (2013.01); *G06Q 30/08* (2013.01); *H04L 63/10* (2013.01)

(58) Field of Classification Search
CPC . H04L 63/10; H04L 63/1425; H04L 63/1433; G06Q 30/08
See application file for complete search history.

(56) References Cited

U.S. PATENT DOCUMENTS

| | | | |
|---|---|---|---|
| 9,875,244 B1* | 1/2018 | Kuznetsov | G06F 16/435 |
| 9,973,910 B1* | 5/2018 | Dannamaneni | H04W 4/21 |
| 10,218,765 B1* | 2/2019 | Zhu | H04L 47/27 |
| 2010/0115621 A1* | 5/2010 | Staniford | H04L 63/1416 726/25 |
| 2019/0130508 A1* | 5/2019 | Lantz | G06N 7/005 |
| 2019/0347266 A1* | 11/2019 | York | G06F 40/289 |
| 2020/0034892 A1* | 1/2020 | Huang | G06F 16/9574 |

* cited by examiner

*Primary Examiner* — Beemnet W Dada
(74) *Attorney, Agent, or Firm* — Cooper Legal Group, LLC

(57) ABSTRACT

One or more computing devices, systems, and/or methods for assessing riskiness of a domain are provided. For example, a content request is received from a content provider service that hosts a website associated with a domain. The content request is evaluated to identify request features. Feature scores are assigned to the request features using labeled feature data. The feature scores are aggregated to generate a content request risk score corresponding to a riskiness of the content request corresponding to fraud, such as domain spoofing. The content request risk score along with other content request risk scores of content requests associated with the content provider service are aggregated to create a content provider risk score corresponding to a riskiness of the content provider service, such as a risk of the domain being fraudulent. The content provider risk score is used to either block or process the content request.

20 Claims, 6 Drawing Sheets

SYSTEMS AND METHODS FOR ASSESSING RISKINESS OF A DOMAIN

BACKGROUND

A content provider service may provide users with access to content, such as a website or application. For example, a website content provider service may host a website having a particular domain. A browser on a client computer device may request access to the website. Accordingly, the website content provider service transmits content data, such as HyperText Markup Language and/or other website data, over a network to the client computer device, which is then used by the browser to render the website through a display of the client computer device.

The content provider service may include additional content within the website. Such additional content may be available from a third party content source, such as weather data, a coupon, a link to purchase a service or item, a photo, a video, etc. In order to obtain this additional content, the content provider service transmits a content request over a network to a content platform, such as a demand-side platform. The content platform processes the content request, and transmits back requested content that the content provider service can include within the website that will be provided to the client computer device as the content data.

Unfortunately, the domain of the website hosted by the content provider service can become spoofed, taken over, or otherwise compromised. This can lead to abuse of the content platform if the content platform cannot detect fraudulent requests from the domain. Conventional technical processes for detecting fraud can use blacklists that can become easily out-of-date due to not being dynamically updated or require crawling the website, which will not detect websites where the content remains similar (e.g., content appearing to be safe and expected) but has been hijacked by a malicious entity. Thus, computing resources can be wasted using imprecise non-real time and non-dynamic techniques that may not detect certain situations of fraud, thus causing security risks to computing environments and computers.

SUMMARY

In accordance with the present disclosure, one or more computing devices and/or methods for assessing riskiness of a domain, such as a website provided by a content provider service, are provided. In one embodiment, a content request is received over a network from a remote computer hosting a content provider service that transmits content data (e.g., website data, application data, etc.) over the network to computing devices for rendering on displays of the computing devices. For example, the content provider service hosts a website that can be accessed by browsers of user computing devices, such as mobile phones, smart watches, tablets, desktops, etc. When the content provider service receives a request for the website from a requestor of a requestor computing device (e.g., a user of a mobile phone attempting to access the website), the content provider service generates content data, such as HTML, that can be used by the requestor computing device to render the website on the requestor computing device. The content provider service may include additional content within the website that is provided by external content sources accessible through a content platform, such as a demand-side platform (e.g., a video of a new toy provided by a toy store, a television coupon image provided by an electronics store, etc.). Accordingly, the content provider service sends the content request to the content platform.

The content platform evaluates the content request to identify request features. The request features may comprise a time of the content request. The request features may comprise characteristics of the requestor computing device that requested the website from the content provider service, such as a location, operating system, device type (e.g., mobile or desktop), IP address, and/or other characteristics of the requestor computing device. The request features may comprise content provider characteristics of the content provider service, such as a domain of the website, a sub-domain, a publisher category, a website layout, a position within the website at which the requested content will be displayed, etc. The request features may comprise requestor behavior and demographic information of the requestor, such as age, gender, cookie ages of cookies maintained for the requestor, historic website visit and interaction information, click behavior, location, etc.

For each request feature, a feature score is assigned to a request feature based upon a score of a labeled feature corresponding to the request feature. For example, a score may have been previously assigned to a labeled feature using a set of labeling rules, such as where a relatively higher score (e.g., 90 out of 100 where higher scores are more indicative of riskier content requests that are fraudulent) was assigned to a feature of a user accessing a large number of websites in a short amount of time that is indicative of a bot or non-humanistic input behavior. Thus, the score of the labeled feature is used to assign the feature score a corresponding request feature indicating that the requestor has been accessing a large number of websites in a short amount of time.

The feature scores of the request features of the content request are aggregated to assign a content request risk score for the content request (e.g., a value between 0 and 100 or any other range of values). The content request risk score may be indicative of a likelihood that the content request is fraudulent, such as a request that resulted from domain spoofing. The feature scores may be aggregated by taking an average of the feature scores or some other combination/aggregation of the feature scores, which may also be normalized (e.g., a score of 90 for a time of day feature for a mobile device may be equivalent to a score of 95 for a time of day feature for a desktop, and thus the scores may be normalized). In this way, content request risk scores may be generated for a plurality of content requests from the content provider service, such as in real-time as the content requests are received.

The content request risk scores for the content requests by the content provider service are aggregated to create a content provider risk score for the content provider service. The content provider risk score may be indicative of a likelihood that the content provider service is fraudulent or is experience a fraudulent attack, such as domain spoofing (e.g., the content provider service is actually a malicious entity that is purporting to be a legitimate entity that normally hosts the website). The content request risk scores may be aggregated by taking an average or some other combination/aggregation of the content request risk scores. The content provider risk score may be updated dynamically in real-time as new content requests are received, which can account for temporary spoofing and other temporary fraudulent activity that can be resolved.

If the content provider risk score exceeds a threshold risk, then the content provider service is blocked such as where requested content is not provided back to the content provider service. Otherwise, if the content provider risk score does not exceed the threshold risk, then the requested content is transmitted back to the content provider service.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
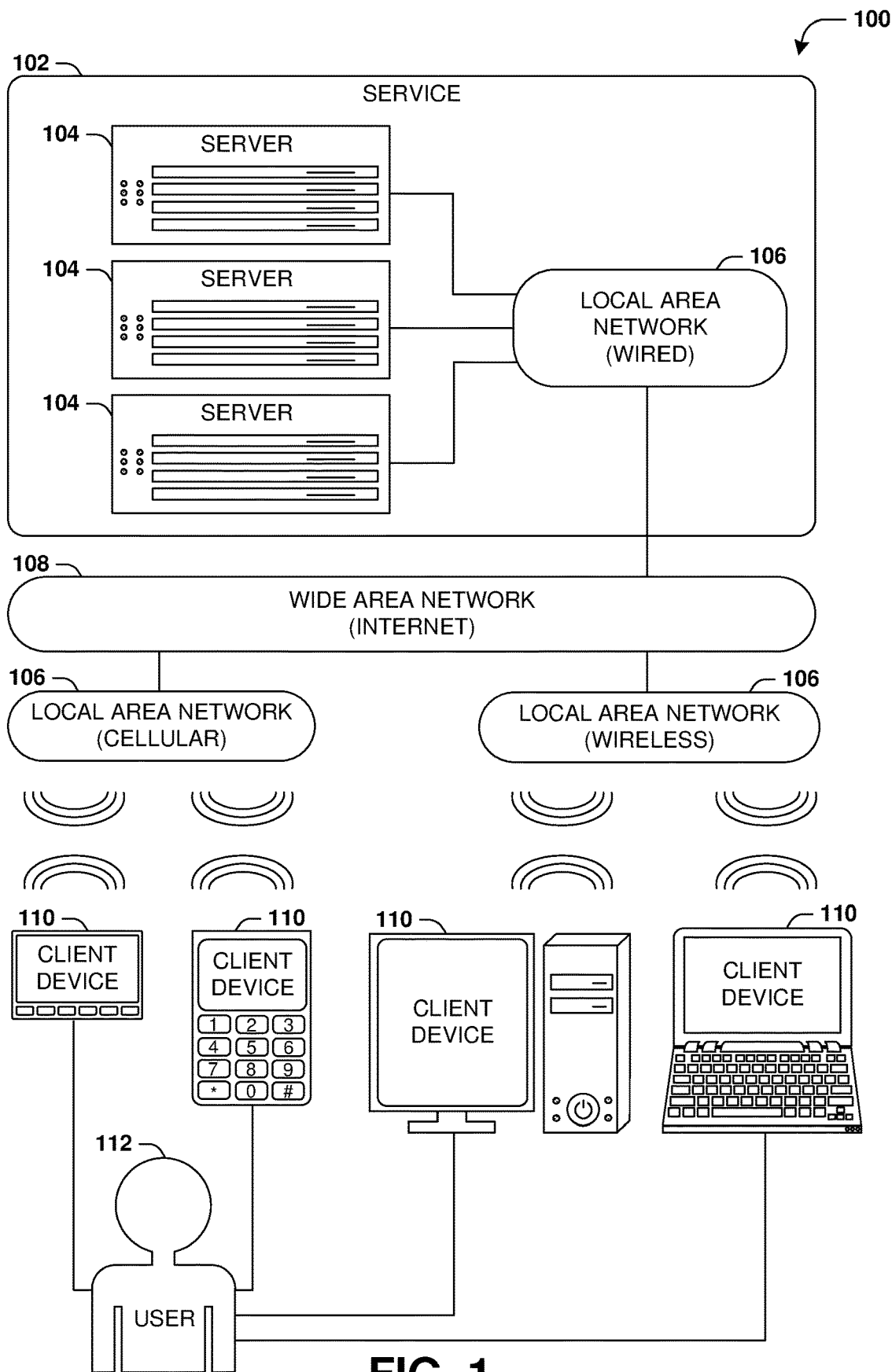
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
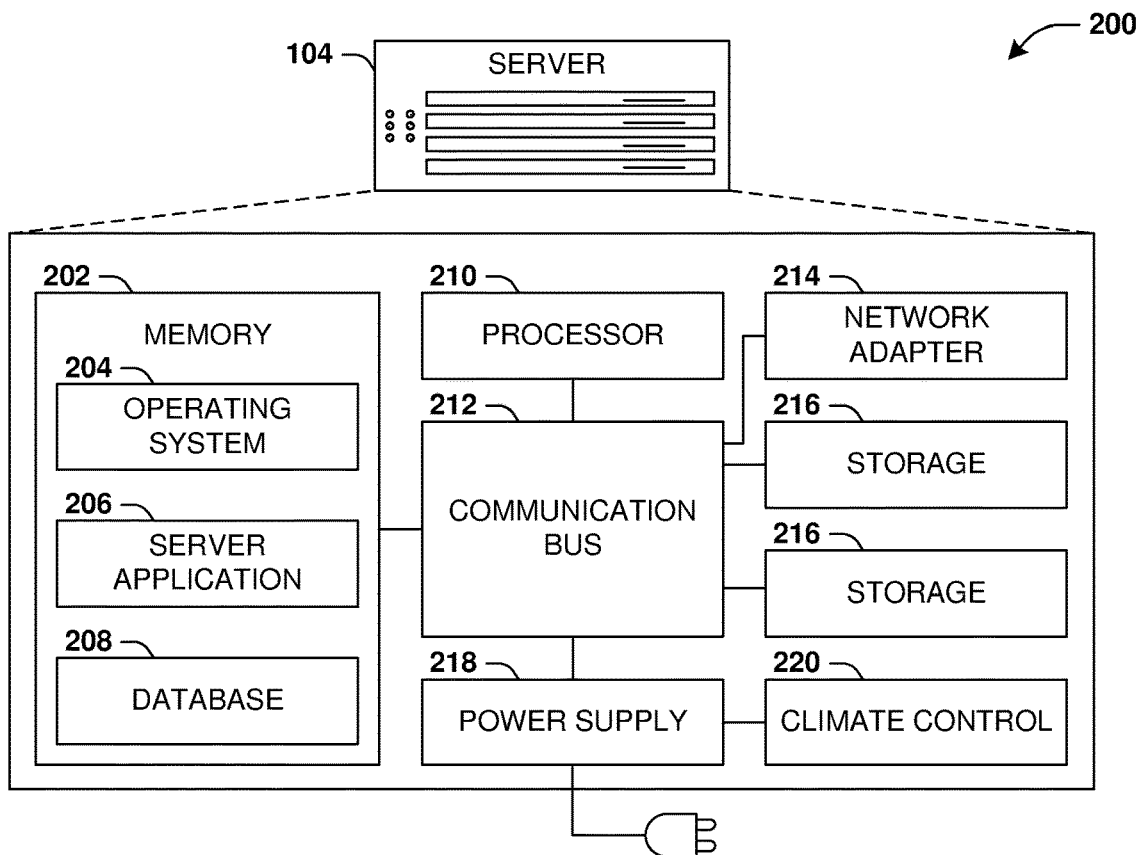
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
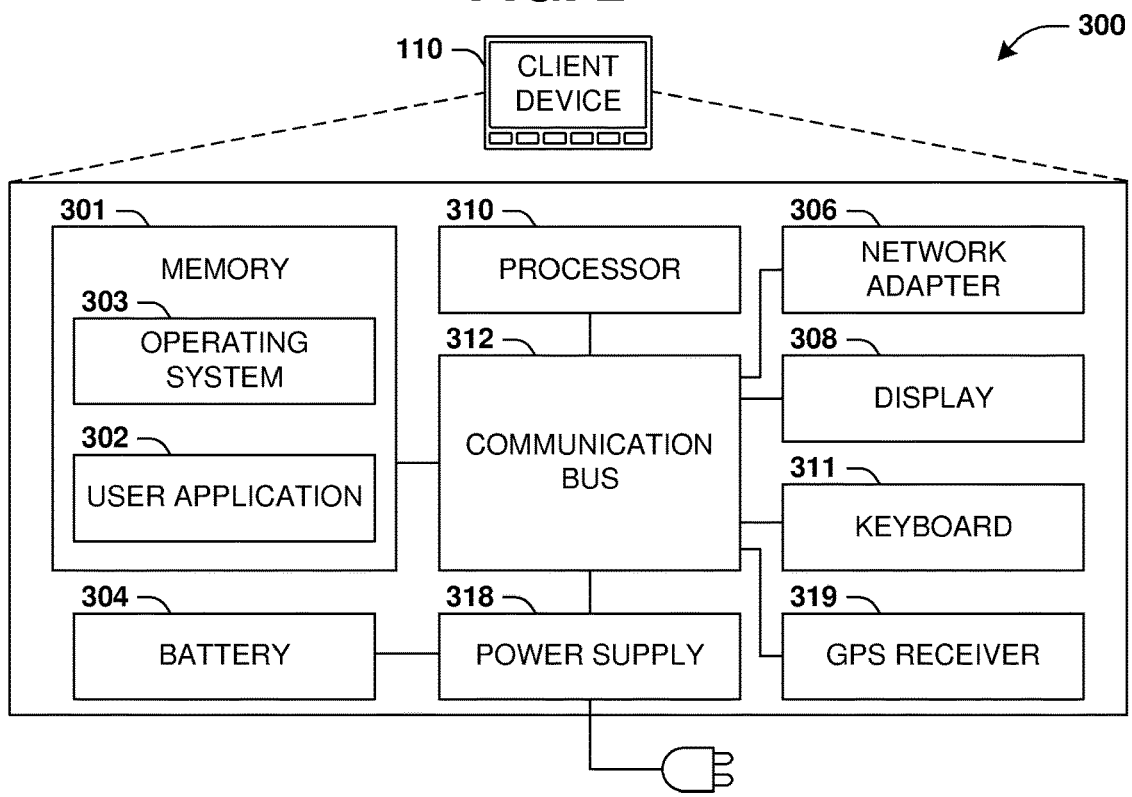
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for assessing riskiness of a domain, such as of a website or application hosted by a content provider service, are provided. In particular, this technique improves existing technological processes for detecting fraudulent activities, such as domain spoofing, by monitoring various behavioral aspects of a domain (e.g., how users interface with a website associated with the domain) that are otherwise difficult for fraudulent entities to manipulate in order to remain undetected. This technical process can be implemented in near real-time and produce a continuous risk score proportional to a likelihood of the domain being fraudulent, as opposed to convention blacklisting techniques that merely provide a binary value of whether a domain is blacklisted or not. Furthermore, this technical process can detect fraudulent domains that otherwise would not be detected by conventional crawling techniques where the content of the domain appears to be safe/expected but the domain has been hijacked. In this way, convention technological processes for detecting fraud are improved, which enhances the security of computers and computer environments.

Figure 4:
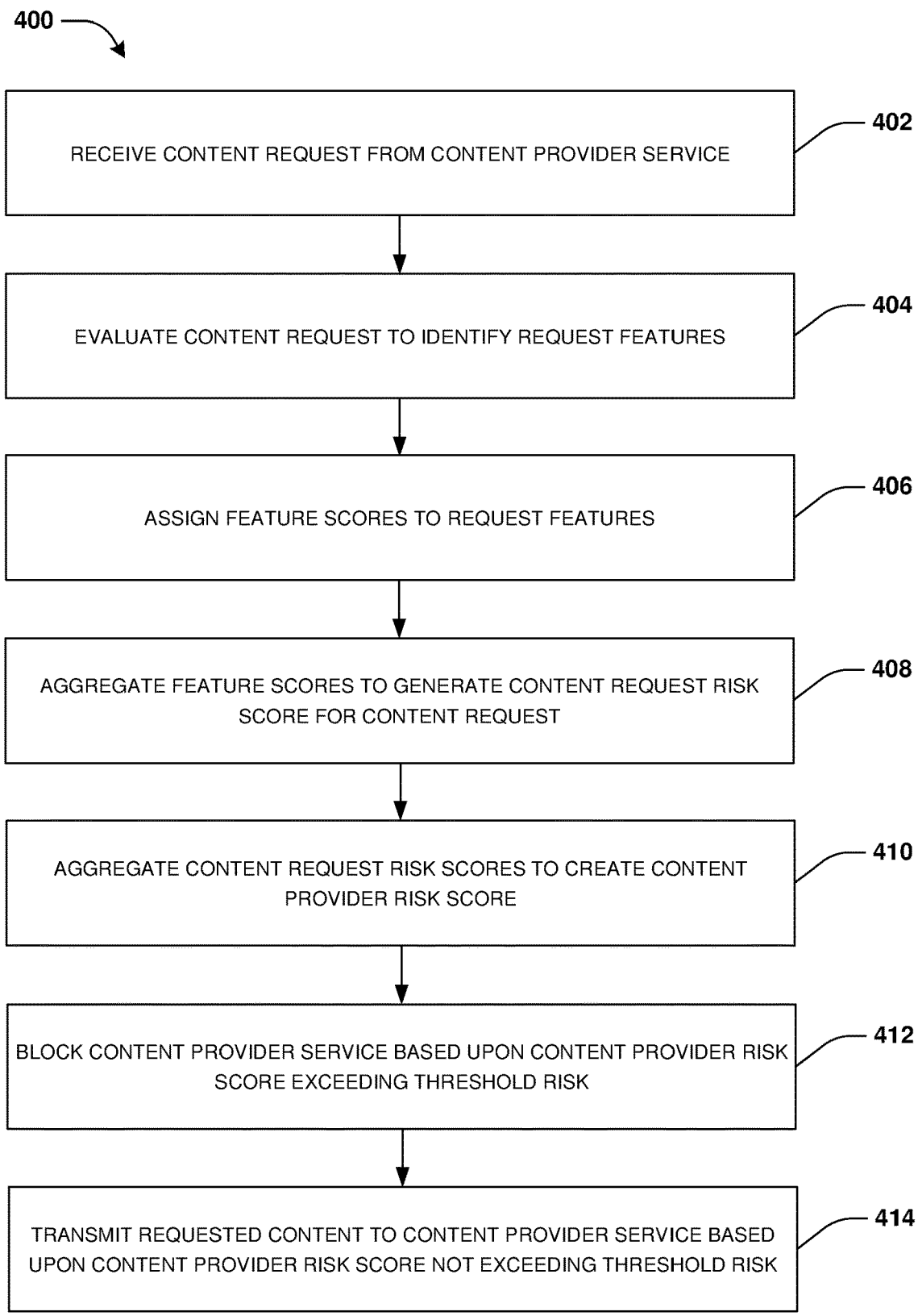
FIG. 4 is a flow chart illustrating an example method for assessing riskiness of a domain.
Figure 5:
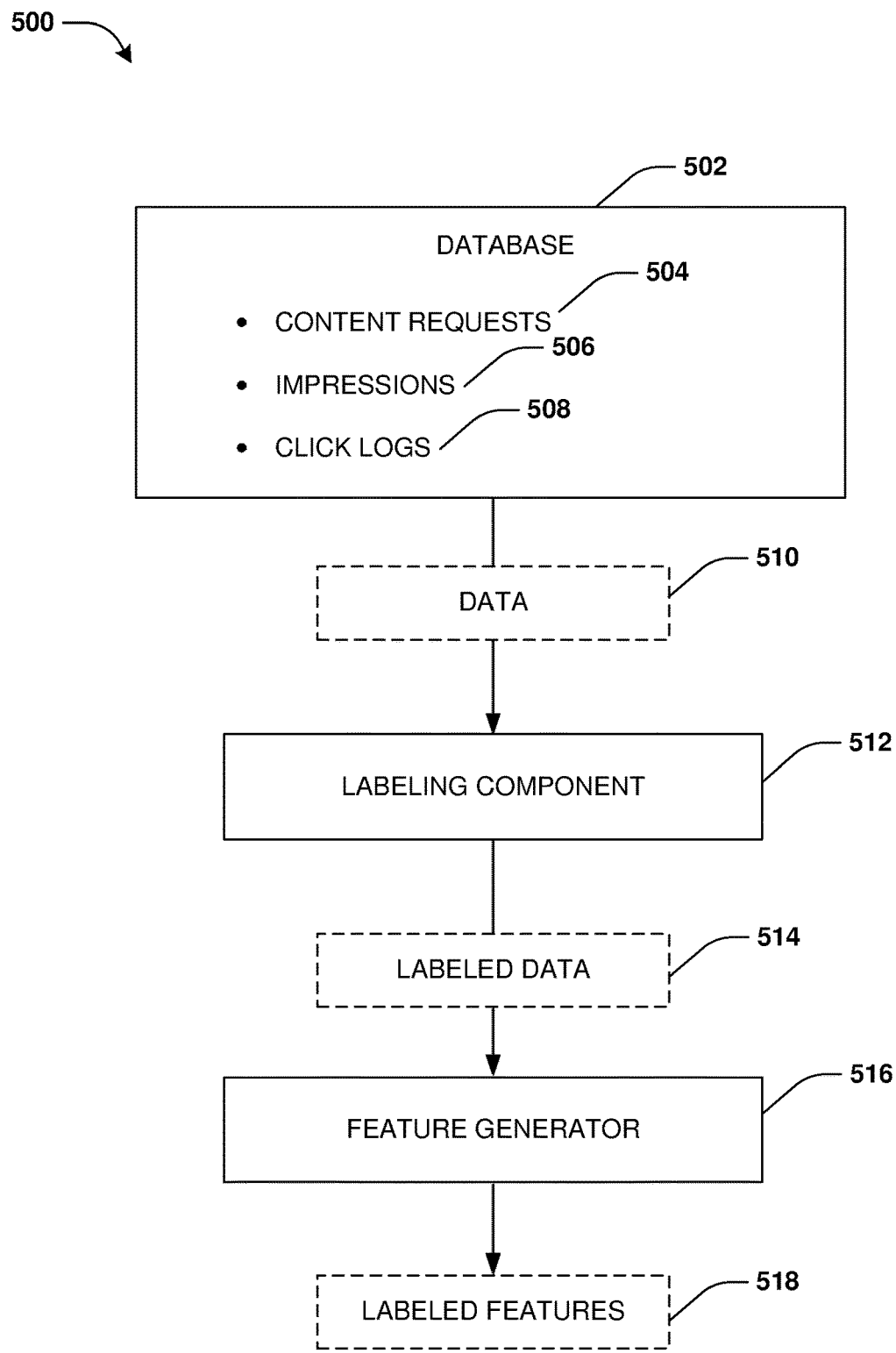
FIG. 5 is a component block diagram illustrating an example system for assessing riskiness of a domain.
Figure 6:
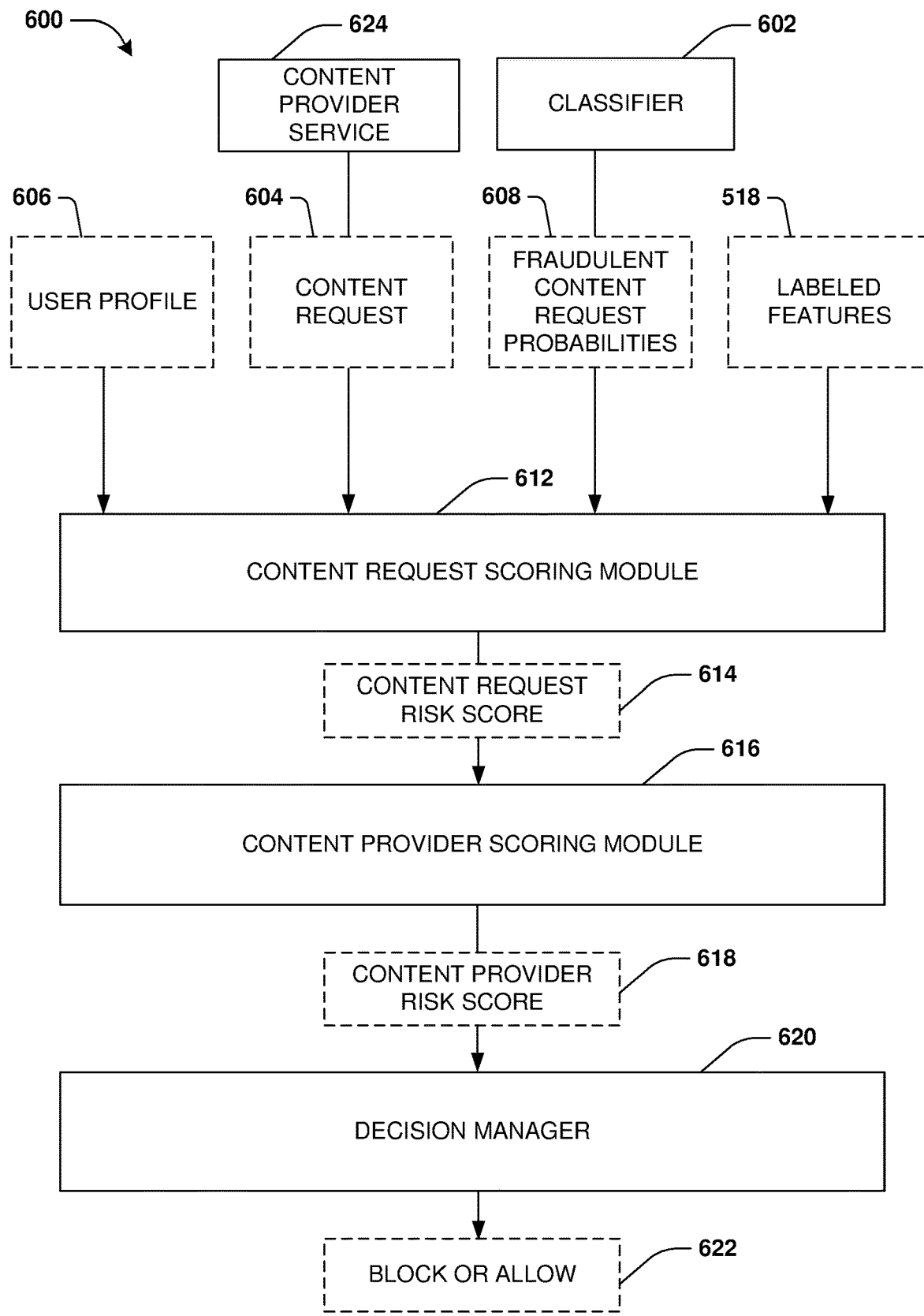
FIG. 6 is a component block diagram illustrating an example system for assessing riskiness of a domain, where a content provider service is either blocked or provided with requested content.

An embodiment of assessing riskiness of domains, is illustrated by an example method 400 of FIG. 4 and is described in conjunction with the system 500 of FIG. 5 and the system 600 of FIG. 6. A content provider service 624, as illustrated in FIG. 6, may host content, such as a website or an application, accessible to users (e.g., a website accessible through a browser, an application executable on a computing device, etc.). For example, the content provider service 624 hosts a videogame website that is accessible through a domain name.

The content provider service 624 may populate the videogame website with videogame articles, along with additional content provided by third party content providers, such as weather data, a link to a service, a coupon, a link to purchase a product, etc. To request access to such additional content, the content provider service 624 may submit content requests, such as bids, to a content platform, such as a demand-side platform, that can provide access to requested content accessible from the third party content providers (e.g., a coupon from an electronics store). Unfortunately, the content provider service 624 may be fraudulent (e.g., a malicious entity attempt to appear to be the real actual content provider service) or the domain of the content provider service 624 may become compromised through fraudulent activity, such as domain spoofing. Accordingly, as provided herein, content provider risk scores are dynamically assigned and update in real-time for content providers to determine whether to process or block content requests.

Dynamic assignment of content provider risk scores uses labeled features 518 for scoring. The labeled features 518 are generated by a feature generator 516, as illustrated in FIG. 5. In particular, a database 502 is maintained with data 510 comprising content requests 504 from content provider services, impressions data 506 indicative of users viewing content through websites and/or applications hosted by the content provider services, click logs 508 of what content users clicked through the websites and/or applications, and/or other data.

A labeling component 512 is configured to execute various rules to label the data 510 to create labeled data 514 of labeled content requests. The rules are used to identify known fraudulent data based on domain knowledge and outlier detection techniques. The rules are used to label content requests as fraudulent or safe/normal. The rules operate based upon various dimensions, such as a user dimension of user based characteristics (e.g., actions by a user, such as an amount of time actively visiting websites during a day, how many page views are performed within a certain time period, how many different IPs are used by a user within a time period, how many different user agents are associated with the user within a time period such as different browsers, operating systems, application types, software versions, etc.). The rules can also operate based upon a variety of other dimensions, such as an IP dimension, and IP subnet dimension, a user agent dimension, a domain dimension, a subdomain dimension, an application name dimension, and/or combinations thereof.

In one example of the rules, a rule, such as a user dimension rule, is used to label a content request as fraudulent based upon the content request corresponding to characteristics of a threshold number of web page views within a time period, such as where a client computer is making too many page views within a certain amount of time such as 5 minutes, an hour, a day, etc. that is characteristic of a bot or not normal human browsing behavior. The rule can also apply to where there are too many user agents (e.g., a software agent acting on behalf of a user such as a web browser) or IP addresses being used by the user within a time period that is not normal behavior.

In another example of the rules, a rule, such as a user dimension rule, is used to label a content request as fraudulent based upon the content request corresponding to characteristics of user activity being active greater than a threshold time span, such as where the client computer is actively browsing websites all hours of a 24 hour period that is not normal human browsing behavior.

In another example of the rules, a rule, such as an IP dimension rule, is used to label a content request as fraudulent based upon the content request corresponding to characteristics of a new cookie rate being provided to users that exceeds a threshold, such as where too many new cookies are being provided to users without any returning users that already have cookies, which is indicative of fraudulent or abnormal behavior. Other IP dimension rules may label content requests as fraudulent where the same IP addresses are visiting the same ULRs over and over or where IP address traffic does not fluctuate, which is indicative of fraudulent or abnormal behavior.

In another example of the rules, domain dimension rules may be used to label content requests as fraudulent where the new cookie rate exceeds a threshold, where domain traffic is coming from a limited set of IP addresses, where domain traffic does not fluctuate, etc. In another example of the rules, user agent dimension rules may be used to label content requests as fraudulent where known bad user agents are associated with content requests and/or through the use of crawlers.

In another example of the rules, a rule is used to label a content request as fraudulent based upon the content request corresponding to characteristics of a click rate of content exceeding a threshold that is indicative of non-human user input. The rule can apply to click rates with respect to users, IP addresses, domains, applications, etc.

In another example of the rules, a rule is used to label a content request as fraudulent based upon the content request corresponding to characteristics of a computing device of a user accessing a threshold number of websites within a time period, such as where the same user is accessing multiple websites in a very short period of time.

In this way, the labeling component 512 can utilize a variety of rules to evaluate and label content requests as fraudulent or safe to create the labeled data 514. A feature generator 516 uses the labeled data 514 to generate the labeled features 518 that can be used for dynamic real-time scoring of content provider services, such as domain scoring. The labeled features 518 are features that are indicative of a likelihood of fraud, such as an hour of day feature where user activity during the night is riskier, an IP address feature where user activity using a lot of different IP address is riskier, a location feature where user access from a lot of different locations is riskier, etc. The labeled features 518 are encoded using a weight of evidence that is a probability of risk of fraud. The weight of evidence is a statistical measure of relative risk of fraud, such as where a positive value means that a fraud probability of a sub population of content requests is higher than an overall population of content requests.

The labeled features 518 are used by a content request scoring module 612 for assigning content request risk scores to content requests from the content provider service 624, such as in real-time as the content requests are received, as illustrated in FIG. 6. At 402, a content request 604 is received over a network from a remote computer hosting the content provider service 624, which may be received by the content request scoring module 612. For example, a requestor may use a requestor computing device (e.g., a user using a mobile device, a desktop device, a tablet, etc.) to request access to a website hosted by the content provider service 624. While generating content data, such as HTML or other data that can be used by a browser or application of the requestor computing device to render the website, the content provider service 624 may determine that content provided by an third party content provider is to be included within the website, such as an image or video. Accordingly, the content provider service 624 transmits the content request 604 to a content platform that can return the requested content, such as the image or video. The content request 604 may be a bid to display the content through the website, and the content platform may be a demand-side platform. The content request scoring module 612 may be implemented for the content platform for scoring the content request 604.

At 404, the content request scoring module 612 evaluates the content request 604 to identify request features. The content request scoring module 612 may extract a timestamp from the content request 604 to determine a time of the content request 604 as a request feature. The content request scoring module 612 identifies characteristics of the requestor computing device of the requestor that requested access to the website from the content provider service 624 as request features. The characteristics of the requestor computing device may comprise a country, a zip code, an IP address, an operating system, a browser, a device type (e.g., smart phone, smart watch, desktop, etc.), an application name of an application that requested access to the website, and/or other information.

The content request scoring module 612 identifies characteristics of the content provider service 624 as request features. The characteristics of the content provider service 624 may comprise a domain of the website, a sub-domain, a publisher category of the content provider service 624, a website layout of the website, a position within the website at which the requested content will be rendered, a supply side platform subscribed to by the content provider service 624, etc.

The content request scoring module 612 identifies requestor behavior of the requestor as request features. For example, the content request scoring module 612 evaluates a user profile 606 and/or other data sources/signals to identify demographics and/or other behavior of the requestor, such as age, location, gender, cookie ages of cookies maintained for the requestor, historic website visit and interaction information of the requestor, click behavior of the requestor, etc.

For each request feature, the content request scoring module 612 assigns a feature score, at 406. The content request scoring module 612 uses the labeled features 518 and fraudulent content request probabilities 608 provided by a classifier 602 to assign the feature scores. The classifier 602 uses the labeled features 518 encoded with the weight of the evidence to output probabilities that content requests are fraudulent. In one example of assigning a feature score to a request feature, a labeled feature corresponding to the request feature is identified (e.g., if the request feature corresponds to a time of day of when the content request 604 was received, then the labeled feature correspond to a time of day labeled feature). A score of the labeled feature is used to assign the feature score to the request feature. In this way, the request feature is assigned a feature score. At 408, the content request scoring module 612 aggregates the feature scores of the request features to create a content request risk score 614 indicative of a probability that the content request 604 is associated with fraudulent behavior such as domain spoofing of the domain of the website hosted by the content provider service 624. In one example, the content request scoring module 612 may aggregate the feature scores using various techniques, such as using a machine learning model such as logistic regression, gradient boosting machine, or a neural network (e.g., classifier 602).

A content provider scoring module 616 is configured to aggregate (e.g., combine, average, etc.) the content request risk score 614 with a plurality of content risk scores already generated for content requests received from the content provider service 624, at 410. The content request risk scores are aggregated to create a content provider risk score 618. The content provider risk score 618 may be determined in near real-time, such as during a time period between the requestor requesting the website and the website being provided to the requestor computing device (e.g., during processing of the content request 604 by the content platform). The content provider risk score 618 may comprise a value indicative of a likelihood that the content provider service 624 is fraudulent, such as being domain spoofed. In one example, the content provider risk score 618 is not a binary value but is a value within a range of values of riskiness, such as from 0 to 100 where 0 is low risk and 100 is high risk of fraud, or any other range of values. The content provider risk score 618 may be periodically updated, such as continually updated as new content requests are received from the content provider service 624.

A decision manager 620 uses the content provider risk score 618 to determine how to process 622 the content request 604. At 412, the decision manager 620 blocks the content request 604 based upon the content provider risk score 618 exceeding a threshold risk (e.g., a high risk). In this way, a domain of the content provider service 624 may be determined as being domain spoofed. At 414, the decision manager 620 transmits requested content back to the content provider service 624 for the content request 604 based upon the content provider risk score 618 not exceeding the risk threshold. If the content provider risk score 618 is between the risk threshold and a first threshold (e.g., a medium risk), then the requested content may be provided back to the content provider service 624, but a bid price paid to the content provider service 624 for user interaction (e.g., an impression, a click, a purchase of a product/service, etc.) with the requested content through the website may be discounted.

The content provider risk score 618 may be stored within a database mapping content request risk scores to content provider services. As new content requests are received and scored with content request risk scores, the content provider risk score 618 may be updated with a new value based upon the new content request risk scores. Thus, if the content provider service 624 was previously blocked, the content provider service 624 may be subsequently unblocked after one or more non-risky content request are received (e.g., the domain spoofing was resolved).

Figure 7:
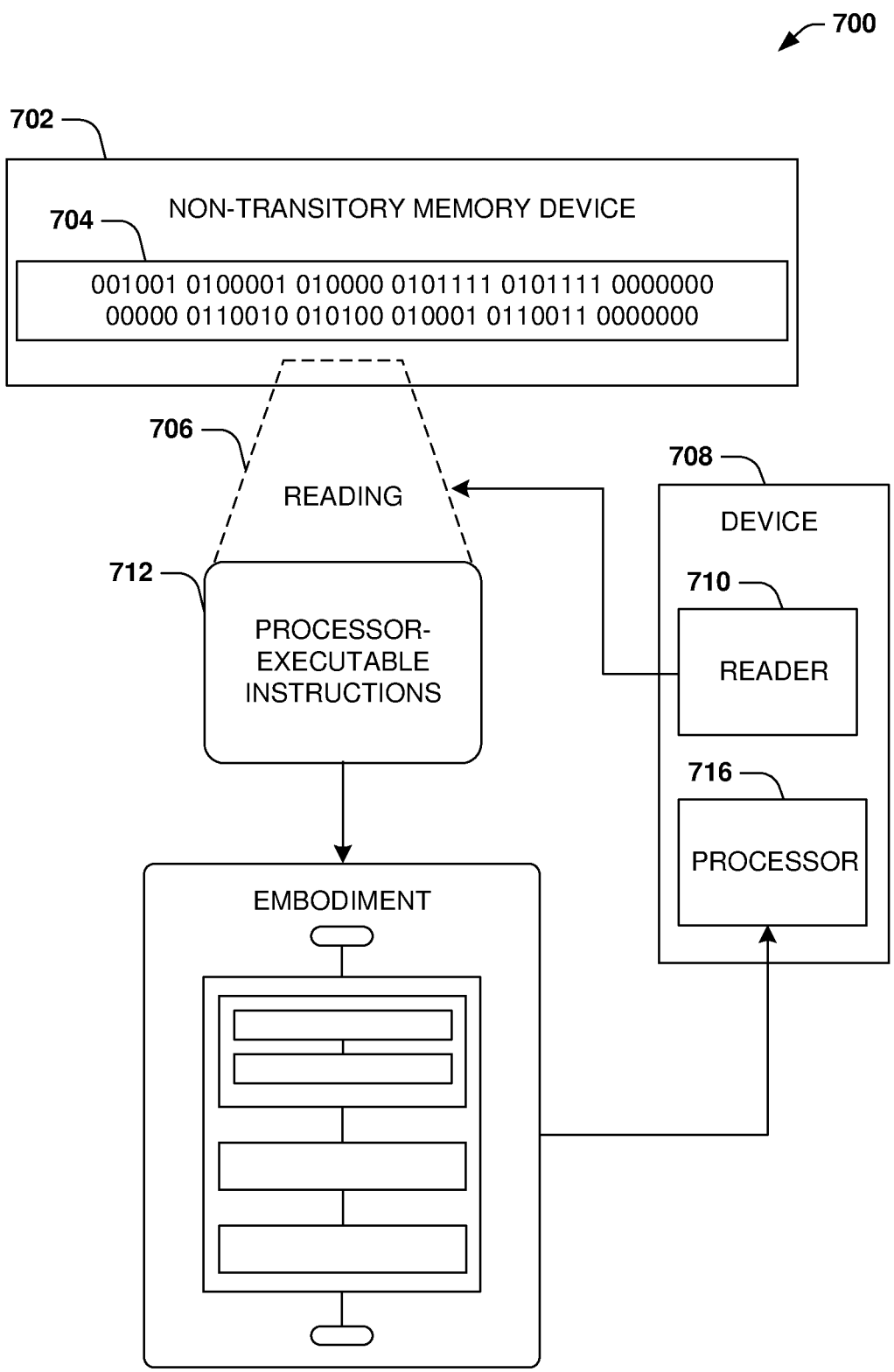
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4, for example. In some embodiments, the processor-executable instructions 712 are configured to cause implementation of a system, such as at least some of the example system 500 of FIG. 5 and/or at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
receiving a content request over a network from a remote computer hosting a content provider service that transmits content data over the network to computing devices for rendering on displays of the computing devices;
evaluating the content request to identify request features, wherein the request features correspond to at least one of a time of the content request, characteristics of a requestor computing device of a requestor that requested the content data from the content provider service, content provider characteristics of the content provider service, or requestor behavior of the requestor;
for each request feature, assigning a feature score to a request feature based upon a score of a labeled feature corresponding to the request feature;
aggregating the feature scores to generate a content request risk score for the content request;
aggregating the content request risk score with a plurality of content risk scores for a plurality of content requests received from the content provider service to create a content provider risk score;
blocking the content provider service based upon the content provider risk score exceeding a threshold risk; and
transmitting requested content to the content provider service for the content request based upon the content provider risk score not exceeding the threshold risk.

2. The method of claim 1, comprising:
storing the content provider risk score within a database mapping content provider risk scores to content provider services;
in response to receiving a subsequent content request from the content provider service, utilizing the subsequent content request, the content request, and the plurality of content requests to create a new content provider risk score for the content provider service; and
updating the content provider risk score within the database with the new content provider risk score.

3. The method of claim 1, wherein the content provider risk score comprises a value indicative of a likelihood that the content provider service is fraudulent.

4. The method of claim 1, comprising:
determining that a domain of the content provider service is being domain spoofed based upon the content provider risk score exceeding the threshold risk.

5. The method of claim 1, wherein the content provider service is blocked based upon the content provider risk score exceeding a threshold risk, and the method comprising:
receiving a subsequent content request from the content provider service;
utilizing the subsequent content request, the content request, and the plurality of content requests to create a new content provider risk score for the content provider service; and
responsive to the new content provider risk score not exceeding the threshold risk, unblocking the content provider service and transmitting corresponding requested content to the content provider service for the subsequent content request.

6. The method of claim 1, wherein the content request is a bid to display content of a content source through a user interface constructed using the content data.

7. The method of claim 6, comprising:
responsive to the content provider risk score exceeding a first threshold:
transmitting the requested content to the content provider service for the content request; and
discounting a bid price paid to the content provider service for user interaction with the requested content through the user interface.

8. The method of claim 1, wherein the characteristics of the requestor computing device comprise at least one of a country where the requestor computing device is located, a zip code where the requestor computing device is located, an IP address of the requestor computing device, a browser of the requestor computing device, an operating system of the requestor computing device, a device type of the requestor computing device, or an application name of an application of the of the requestor computing device requesting the content data.

9. A computing device comprising:
a processor; and
memory comprising processor-executable instructions that when executed by the processor cause performance of operations, the operations comprising:
receiving a content request over a network from a remote computer hosting a content provider service that transmits content data over the network to computing devices for rendering on displays of the computing devices;
evaluating the content request to identify request features, wherein the request features correspond to at least one of a time of the content request, characteristics of a requestor computing device of a requestor that requested the content data from the content provider service, content provider characteristics of the content provider service, or requestor behavior of the requestor;
for each request feature, assigning a feature score to a request feature based upon a score of a labeled feature corresponding to the request feature;
aggregating the feature scores to generate a content request risk score for the content request;
aggregating the content request risk score with a plurality of content risk scores for content requests received from the content provider service to create a content provider risk score;
blocking the content provider service based upon the content provider risk score exceeding a threshold risk; and
transmitting requested content to the content provider service for the content request based upon the content provider risk score not exceeding the threshold risk.

10. The computing device of claim 9, wherein the operations comprise:

accessing a database comprising data of content requests, content impressions, and click logs; and applying a set of rules to characteristics of the data to label the content requests of the database to create labeled content requests.

11. The computing device of claim 10, wherein a rule of the set of rules labels a first content request as fraudulent based upon the first content request corresponding to characteristics of a threshold number of web page views within a time period.

12. The computing device of claim 10, wherein a rule of the set of rules labels a first content request as fraudulent based upon the first content request corresponding to characteristics of user activity being active greater than a threshold time span.

13. The computing device of claim 10, wherein a rule of the set of rules labels a first content request as fraudulent based upon the first content request corresponding to characteristics of a new cookie rate provided to users exceeding a threshold.

14. The computing device of claim 10, wherein a rule of the set of rules labels a first content request as fraudulent based upon the first content request corresponding to characteristics of an internet protocol address visiting a same website a threshold amount of time within a time span.

15. The computing device of claim 10, wherein a rule of the set of rules labels a first content request as fraudulent based upon the first content request corresponding to characteristics of a click rate of content exceeding a threshold indicative of non-human user input.

16. The computing device of claim 10, wherein a rule of the set of rules labels a first content request as fraudulent based upon the first content request corresponding to characteristics of a user visiting a threshold number of websites within a time period.

17. The computing device of claim 10, comprising:
creating the labeled feature based upon the labeled content requests.

18. A non-transitory machine readable medium having stored thereon processor-executable instructions that when executed cause performance of operations, the operations comprising:

receiving a content request over a network from a remote computer hosting a content provider service that transmits content data over the network to computing devices for rendering on displays of the computing devices;

evaluating the content request to identify request features, wherein the request features correspond to at least one of a time of the content request, characteristics of a requestor computing device of a requestor that requested the content data from the content provider service, content provider characteristics of the content provider service, or requestor behavior of the requestor;

for each request feature, assigning a feature score to a request feature based upon a score of a labeled feature corresponding to the request feature;

aggregating the feature scores to generate a content request risk score for the content request;

aggregating the content request risk score with a plurality of content risk scores for content requests received from the content provider service to create a content provider risk score;

blocking the content provider service based upon the content provider risk score exceeding a threshold risk; and transmitting requested content to the content provider service for the content request based upon the content provider risk score not exceeding the threshold risk.

19. The non-transitory machine readable medium of claim 18, wherein the content provider characteristics comprise at least one of a domain of the content provider service, a sub-domain of the content provider service, a publisher category of the content provider service, a website layout of a website hosted by the content provider service, a position within the website at which the requested content will be rendered, or a supply side platform subscribed to by the content provider service.

20. The non-transitory machine readable medium of claim 18, wherein the requestor behavior comprise at least one of an age of the requestor, a gender of the requestor, cookie ages of cookies maintained for the requestor, historic website visit and interaction information of the requestor, or click behavior of the requestor.

* * * * *